(12) United States Patent
Lin

(10) Patent No.: US 10,894,741 B2
(45) Date of Patent: Jan. 19, 2021

(54) METHOD FOR PREPARING CERAMSITE BY USING MUNICIPAL SLUDGE AS RAW MATERIAL

(71) Applicant: QINGDAO YI ECO-ENVIRONMENTAL PROTECTION TECHNOLOGY CO. LTD, Qingdao (CN)

(72) Inventor: Rongliang Lin, Qingdao (CN)

(73) Assignee: QINGDAO YI ECO-ENVIRONMENTAL PROTECTION TECHNOLOGY CO. LTD, Qingdao (CN)

( * ) Notice: Subject to any disclaimer, the term of this patent is extended or adjusted under 35 U.S.C. 154(b) by 0 days.

(21) Appl. No.: 16/656,600

(22) Filed: Oct. 18, 2019

(65) Prior Publication Data
US 2020/0048147 A1    Feb. 13, 2020

Related U.S. Application Data

(63) Continuation-in-part of application No. PCT/CN2018/063283, filed on Apr. 17, 2018.

(30) Foreign Application Priority Data

Apr. 19, 2017 (CN) .......................... 2017 1 0255007

(51) Int. Cl.
| | | |
|---|---|---|
| C04B 18/02 | (2006.01) | |
| C04B 14/04 | (2006.01) | |
| C04B 14/10 | (2006.01) | |
| C04B 14/22 | (2006.01) | |
| C04B 14/28 | (2006.01) | |
| C04B 14/30 | (2006.01) | |
| C04B 18/10 | (2006.01) | |
| C04B 18/30 | (2006.01) | |
| C04B 24/04 | (2006.01) | |
| C04B 24/16 | (2006.01) | |
| C04B 28/08 | (2006.01) | |
| C04B 111/00 | (2006.01) | |

(52) U.S. Cl.
CPC .......... *C04B 18/021* (2013.01); *C04B 14/047* (2013.01); *C04B 14/106* (2013.01); *C04B 14/22* (2013.01); *C04B 14/28* (2013.01); *C04B 14/308* (2013.01); *C04B 18/103* (2013.01); *C04B 18/305* (2013.01); *C04B 24/04* (2013.01); *C04B 24/16* (2013.01); *C04B 28/082* (2013.01); *C04B 2111/00784* (2013.01)

(58) Field of Classification Search
CPC ....... C04B 14/28; C04B 14/106; C04B 14/22; C04B 14/047; C04B 14/108; C04B 14/308; C04B 18/103; C04B 18/021; C04B 18/023; C04B 18/027; C04B 18/305; C04B 18/08; C04B 18/106; C04B 18/142; C04B 24/04; C04B 24/16; C04B 28/021; C04B 28/082; C04B 33/00; C04B 33/1321; C04B 33/323; C04B 33/138; C04B 33/1352; C04B 33/1305; C04B 33/02; C04B 33/1355; C04B 33/13; C04B 33/135; C04B 33/32; C04B 35/6262; C04B 35/62204; C04B 38/009; C04B 38/0665; C04B 40/0268; C04B 2111/00784; C04B 2235/96; C04B 2235/3472; C04B 2235/3244; C04B 2235/77; C04B 2235/349; C04B 2235/6567; C04B 2235/36; C04B 2235/661; C04B 2235/5454; C04B 2235/3873; C04B 2235/3206; C04B 2235/3208; C04B 2235/3481; C04B 2235/3272; C04B 2235/3427; C04B 2235/3463; Y02P 40/60; Y02W 30/91

See application file for complete search history.

(56) References Cited

U.S. PATENT DOCUMENTS

| | | | |
|---|---|---|---|
| 10,737,238 B2 * | 8/2020 | Lin ..................... | B01J 20/12 |
| 2019/0322586 A1 * | 10/2019 | Jia ..................... | C04B 35/632 |

FOREIGN PATENT DOCUMENTS

| CN | 1367156 | A | | 9/2002 |
|---|---|---|---|---|
| CN | 101215150 | A | * | 7/2008 |
| CN | 101215150 | A | | 7/2008 |
| CN | 101224972 | A | | 7/2008 |
| CN | 102060426 | A | | 5/2011 |
| CN | 102320854 | A | | 1/2012 |

(Continued)

*Primary Examiner* — Anthony J Green

(74) *Attorney, Agent, or Firm* — Bayramoglu Law Offices LLC

(57) ABSTRACT

A method for preparing ceramsite by using municipal sludge as raw material, including the following specific steps: drying; preparing ingredients including raw sludge, fly ash, kaolinite, steelmaking slag, zeolite, hematite, calcareous shale, waste incineration fly ash, $Fe_2O_3$, waste glass, calcium carbonate, sodium lauryl sulfate, and sodium benzoate; mixing and stirring uniformly, and putting the stirred materials into a granulating machine for granulation; drying and preheating the material pellets after granulation, and then quickly transferring to a sintering device for first sintering at a low temperature and then sintering at a high temperature; crushing large chunks of the cooled materials; and separating and screening the crushed materials. The method of the present invention reduces the generation of the large chunks of the cooled materials in the obtained ceramsite, thereby reducing the subsequent crushing work and saving energy consumption accordingly.

8 Claims, No Drawings

(56) References Cited

FOREIGN PATENT DOCUMENTS

| CN | 103880472 | A | * | 6/2014 |
| CN | 103880472 | A | | 6/2014 |
| CN | 107216126 | A | | 9/2017 |
| CN | 107721298 | A | * | 2/2018 |

* cited by examiner

METHOD FOR PREPARING CERAMSITE BY USING MUNICIPAL SLUDGE AS RAW MATERIAL

CROSS REFERENCE TO THE RELATED APPLICATIONS

This application is the national phase entry of a continuation-in-part of International Application No. PCT/CN2018/083283, filed on Apr. 17, 2018, which is based upon and claims priority to Chinese Patent Application No. 201710255007.1, filed on Apr. 19, 2017, the entire contents of which are incorporated herein by reference.

TECHNICAL FIELD

The present invention belongs to the field of ceramsite preparation, and more specifically relates to a method for preparing ceramsite by using municipal sludge as a raw material.

BACKGROUND

In recent years, with the rapid development of Chinese cities and the increase of population in China, a significantly increasing amount of municipal sludge is being produced in the cities of China. The conventional methods for treating the municipal sludge are composting, incineration, and land reclamation. Whereas the pollution, caused by a large amount of harmful microorganisms, heavy metals and leachates in the municipal sludge, has raised many people's concerns. The recent environmental regulations have imposed strict regulations on municipal sludge disposal. For example, a few years ago, the municipal sludge could be used directly as agricultural fertilizer. Nowadays, the municipal sludge has been banned as a fertilizer due to a high content of heavy metals in the sludge.

One of the most effective methods for treating the municipal sludge is to use the municipal sludge to produce ceramsite. The production of ceramsite will effectively solve the problem of the municipal sludge accumulation, avoiding secondary pollution to the environment caused by improper discharge. Moreover, the ceramsite, as a lightweight aggregate, can be used in basic buildings, and also alleviates the resource crisis of building materials such as sand, stone, etc. This method complies with the current national policy in China on the resource utilization of solid wastes.

However, the content of organic matter in municipal sludge of sewage treatment plants is excessively high, and the absolute dry weight of the organic matter accounts for more than 70% of the sludge. It is usually not feasible to use this sludge for calcination into ceramsite. When the raw material pellets are subjected to a high temperature, more than 90% of the total volume of the combustible material is lost. The combustible material becomes ash and the volume reduces sharply, thus the material pellets lose support and collapse. The powdery inorganic matter forms some small particles or collapses into powder at high temperatures. A small number of the particles may break apart and then the metal contained within the ash will help the ash to magnetically adhere to each other to form larger particles. Nonetheless, the larger particles are few, which are known as dregs. These dregs have a certain activity and can theoretically be used as fillers for producing concrete. However, due to the instability of the raw sludge itself, the activity of these dregs is extremely unstable, so it is difficult to use.

When the municipal sludge is prepared into ceramsite, the calcination process is a key factor, which not only determines the expansion process during the calcination, but also has an important influence on the microstructure and phase composition of the ceramsite. In addition, the compositions of the raw material for the ceramsite and the ratio of the compositions exert significant effects on the quality of the ceramsite as well. The Chinese patent with Patent Application No. 2011101491242 (Filing Date Jun. 3, 2011), entitled "Method of Sludge Disposal and Resource Utilization in Sewage Treatment Plants", discloses a method for sludge treatment and resource utilization in sewage treatment plants, where the domestic sewage sludge from the municipal sewage treatment plants is taken as a raw material. After the steps of drying, stirring, granulating, sintering, crushing, dusting and powder screening, the sewage sludge is prepared into ceramsite which can be used by the general public. Since the method merely uses the municipal sludge as the raw material, the sludge compositions are relatively single, and the obtained ceramsite has certain limitations in performance and application. The Chinese patent having the patent application Ser. No. 02/149,380 (Filing Date is Mar. 7, 2002), entitled "Method of Sintering a Biological Sludge from a Sewage Treatment Plant into Clay Ceramsite", discloses a method for sintering a biological sludge from a sewage treatment plant into clay ceramsite, where the specific raw material compositions include clay, dry biological sludge from the sewage treatment plant, limestone, and iron powder. This method uses a relatively large amount of clay, resulting in a waste of resources. Therefore, it is necessary to explore a method for preparing ceramsite by combining municipal sludge and various auxiliary materials under a specific production process, to obtain a ceramsite with improved performance and quality which satisfies different requirements, thereby broadening the application range of the ceramsite.

SUMMARY

In order to solve the problems in the prior art, the present invention provides a method for preparing ceramsite by using a municipal sludge as a raw material. The ceramsite obtained by the preparation method has a high strength and a small bulk density, which not only helps to protect the environment and save resources, but also meets the requirements of national standards and market requirements, so that the ceramsite can be better marketed.

In order to achieve the above objective, the present invention provides the following technical solutions.

A method for preparing ceramsite by using a municipal sludge as a raw material includes the following specific steps:

(1) drying: concentrating, digesting, mechanically dehydrating, and drying the municipal sludge to obtain a raw sludge with a water content of 22-24%;

the steps of drying the matter includes: removing a readily biodegradable organic matter in the municipal sludge by a common anaerobic process; specifically, the municipal sludge is poured into a digesting tank, and facultative bacteria and anaerobic bacteria are added to decompose the biodegradable organic matter in the municipal sludge into matters such as carbon dioxide, methane, water, etc.;

(2) preparing ingredients: taking raw materials according to the following parts by weight: 80-120 parts of raw sludge, 10-20 parts of fly ash, 1-5 parts of kaolinite, 5-20 parts of steelmaking slag, 5-15 parts of zeolite, 1-5 parts of hematite, 5-15 parts of calcareous shale, 5-20 parts of waste incineration fly ash, 0.5-2 parts of $Fe_2O_3$, 1-4 parts of waste glass, 0.1-2 parts of calcium carbonate, 0.1-2 parts of sodium lauryl sulfate, and 0.1-1.5 parts of sodium benzoate;

(3) taking the raw materials in step (2), mixing and stirring uniformly, and putting the stirred materials into a granulating machine for granulation, and controlling the particle size to range from 15 mm to 20 mm;

(4) drying material pellets after the granulation at 90-110° C. for 1-2 hours, then preheating at 220-280° C. for 10-20 minutes, and then quickly transferring to a sintering device for sintering;

a two-stage sintering is performed in the sintering device, including: first sintering at a low temperature, and then sintering at a high temperature;

the sintering device has two furnaces, a temperature provided in furnace A is 600-800° C., and the temperature provided in furnace B is 900-1100° C.; the preheated materials are sintered in furnace A for 3-5 minutes, then quickly transferred to furnace B for sintering for 4-6 minutes, and then cooled to room temperature;

(5) discharging the cooled materials, and crushing large chunks of the burnt matter into crushed materials with a maximum particle size of 20-26 mm; and (6) separating and screening the crushed materials to obtain a first ceramsite having a particle size of 5-15 mm, a second ceramsite having a particle size of 15-26 mm, a ceramic sand having a particle size of 0.5-5 mm, and a fine powder having a particle size of less than 0.5 mm.

Preferably, the waste incineration fly ash is from a municipal solid waste treatment plant.

As a preferred embodiment of the present invention, the technical solution is as follows: a method for preparing ceramsite by using a municipal sludge as a raw material, including the following specific steps:

(1) drying: concentrating, digesting, mechanically dehydrating and drying the municipal sludge to obtain a raw sludge;

the step of digesting includes: removing a readily biodegradable organic matter in the municipal sludge by a common anaerobic process;

(2) preparing ingredients: taking raw materials according to the following parts by weight: 80-120 parts of raw sludge, 10-20 parts of fly ash, 1-5 parts of kaolinite, 10-20 parts of steelmaking slag, 5-15 parts of zeolite, 1-5 parts of hematite, 5-15 parts of calcareous shale, 5-20 parts of waste incineration fly ash, 0.5-2 parts of $Fe_2O_3$, 1-4 parts of waste glass, 0.1-2 parts of calcium carbonate, 0.1-2 parts of sodium lauryl sulfate, 0.1-1.5 parts of sodium benzoate, 0.1-0.5 part of nano zirconia, 1-5 parts of kaolinite porcelain clay; 2-4 parts of silicon nitride; and 1-4 parts of calcium oxide;

(3) taking the raw materials in step (2), mixing and stirring uniformly, and putting the stirred materials into a granulating machine for granulation, and controlling the particle size to range from 15 mm to 20 mm;

(4) drying material pellets after the granulation at 90-110° C. for 1-2 hours, then preheating at 220-280° C. for 10-20 minutes, and then quickly transferring to a sintering device for sintering;

(5) discharging the cooled materials, and crushing large chunks of the cooled materials into crushed materials with a maximum particle size of 20-26 mm; and (6) separating and screening the crushed materials to obtain a first ceramsite having a particle size of 5-15 mm, a second ceramsite having a particle size of 15-26 mm, a ceramic sand having a particle size of 0.5-5 mm, and a fine powder having a particle size of less than 0.5 mm.

By the above technical solution, the present invention has the following advantages:

(1) The method of the present invention reduces the generation of the large chunks of the cooled materials in the obtained ceramsite, thereby reducing subsequent crushing and saving energy consumption accordingly.

(2) The prepared ceramsite has a high cylinder compressive strength and a low bulk density. The quality and performance of the ceramsite are significantly improved, which broadens the application range, and can be better marketed.

(3) The use of municipal sludge, steelmaking slag, waste incineration fly ash, waste glass, etc. for the preparation of ceramsite is a recycling method for waste conversion, which is conducive to environmental protection.

DETAILED DESCRIPTION OF THE EMBODIMENTS

The present invention is further illustrated by the following embodiments.

Embodiment 1

A method for preparing ceramsite by using a municipal sludge taken from a sewage treatment plant in Qingdao as a raw material include the following specific steps.

(1) Drying: the municipal sludge is concentrated, digested, mechanically dehydrated and dried to obtain a raw sludge with a water content of about 23%.

The specific step of the digesting include: the municipal sludge poured into the digesting tank, a methane bacterial inoculant and an acetogenic bacterial inoculant are added to the digesting tank, the pH of the municipal sludge is adjusted to about 6.5, and an anaerobic treatment for about 30 hours at 37° C. is performed, wherein 2 liters of the methane bacterial inoculant and 2 liters of the acetogenic bacterial inoculant are added to one ton of the municipal sludge. The amounts of viable bacteria are $10^9$-$10^{12}$ cfu/g per liter of the inoculant.

(2) Preparing ingredients: raw materials are taken according to the following parts by weight: 100 parts of raw sludge, 15 parts of fly ash, 4 parts of kaolinite, 8 parts of steelmaking slag, 12 parts of zeolite, 4 parts of hematite, 12 parts of calcareous shale, 15 parts of waste incineration fly ash, 1 part of $Fe_2O_3$, 2 parts of waste glass, 1.5 parts of calcium carbonate, 1.5 parts of sodium lauryl sulfate, and 1.2 parts of sodium benzoate.

(3) The raw materials in step (2) are taken for mixing and stirring uniformly, the stirred materials are put into a granulating machine for granulation, and the particle size is then controlled to range from 15 mm to 20 mm.

(4) The material pellets after the granulation are dried at 100° C. for 1.5 hours, preheated at 260° C. for 15 minutes, and quickly transferred to a sintering device for sintering.

The sintering device has two furnaces. The temperature provided in furnace A is 700° C., and a temperature provided in the furnace B is 1040° C. The preheated materials are sintered in furnace A for 4 minutes, then quickly transferred to the furnace B for sintering for 5 minutes, and then cooled to room temperature.

(5) The cooled materials are discharged, and large chunks of the cooled materials are crushed to obtain crushed materials with a maximum particle size of 20-26 mm.

(6) The crushed materials are separated and screened to obtain a first ceramsite having a particle size of 5-15 mm, a second ceramsite having a particle size of 15-26 mm, a ceramic sand having a particle size of 0.5-5 mm, and a fine powder having a particle size of less than 0.5 mm.

The waste incineration fly ash is from a municipal solid waste treatment plant.

Four groups of comparative examples are set. The ceramsite is prepared separately, and the properties of the ceramsite are compared.

Comparative example 1: the raw materials for the ceramsite are taken according to the following parts by weight: 250 parts of raw sludge, 15 parts of fly ash, 4 parts of kaolinite, 8 parts of steelmaking slag, 12 parts of zeolite, 4 parts of hematite, 12 parts of calcareous shale, 15 parts of waste incineration fly ash, 1 part of $Fe_2O_3$, 2 parts of waste glass, 1.5 parts of calcium carbonate, 1.5 parts of sodium lauryl sulfate, and 1.2 parts of sodium benzoate.

In comparative example 1, an amount of the municipal sludge is adjusted to a higher ratio, and a weight percentage of the municipal sludge is about 82%. The other steps are the same as that in Embodiment 1.

Comparative example 2: the raw materials for the ceramsite are taken according to the following parts by weight: 20 parts of raw sludge, 15 parts of fly ash, 4 parts of kaolinite, 8 parts of steelmaking slag, 12 parts of zeolite, 4 parts of hematite, 12 parts of calcareous shale, 15 parts of waste incineration fly ash, 1 part of $Fe_2O_3$, 2 parts of waste glass, 1.5 parts of calcium carbonate, 1.5 parts of sodium lauryl sulfate, and 1.2 parts of sodium benzoate.

The treatments of the raw sludge in comparative example 1 and comparative example 2 are the same as that in Embodiment 1.

In comparative example 2, an amount of the municipal sludge is adjusted to a lower ratio, and the weight percentage of the raw sludge is about 27%. The other steps are the same as in Embodiment 1.

Comparative example 3: step (4) is adjusted as: the material pellets after the granulation are dried at 100° C. for 1.5 hours, then preheated at 260° C. for 15 minutes, and then quickly transferred to a sintering device for sintering;

the sintering device had two furnaces, a temperature provided in furnace A is 900° C., and a temperature provided in furnace B is 1250° C.; the preheated materials are sintered in furnace A for 4 minutes, then quickly transferred to furnace B for sintering for 5 minutes, and then cooled to room temperature.

The other steps of comparative example 3 are the same as that in Embodiment 1.

Comparative example 4: the material pellets after the granulation are dried at 100° C. for 1.5 hours, then preheated at 260° C. for 15 minutes, and then quickly transferred to a sintering device for sintering;

the sintering device has two furnaces, the temperature provided in furnace A is 500° C., and the temperature provided in the furnace B is 850° C.; the preheated materials are sintered in furnace A for 4 minutes, then quickly transferred to furnace B for sintering for 5 minutes, and then cooled to room temperature.

The other steps of comparative example 4 are the same as that in Embodiment 1.

The properties of the ceramsite prepared in Embodiment 1 and the four groups of comparative examples are shown in Table 1.

Properties of ceramsite prepared in Embodiment 1 and four groups of comparative examples

|  | Embodiment 1 | Comparative example 1 | Comparative example 2 | Comparative example 3 | Comparative example 4 |
| --- | --- | --- | --- | --- | --- |
| Particle grading | 2.8 | 2.9 | 3.1 | 2.9 | 3.0 |
| Bulk density (kg/m$^3$) | 184 | 164 | 254 | 284 | 295 |
| Apparent density (kg/m$^3$) | 846 | 812 | 905 | 916 | 943 |
| Cylinder compressive strength (MPa) | 2.5 | 1.4 | 2.3 | 1.6 | 1.3 |
| Water absorption rate % | 17.6 | 10.5 | 11.6 | 10.4 | 10.8 |
| Softening coefficient | 0.95 | 0.69 | 0.81 | 0.54 | 0.62 |
| Grain shape factor | 1.36 | 1.45 | 1.52 | 1.69 | 1.73 |
| Sludge content % | 1.8 | 2.5 | 2.1 | 2.8 | 3.1 |
| Sludge lump content % | 0.54 | 1.09 | 1.04 | 1.54 | 2.13 |
| Boiling mass loss % | 4.17 | 5.63 | 5.48 | 6.35 | 6.11 |
| Ignition loss % | 3.8 | 3.9 | 4.1 | 5.2 | 5.6 |
| Content of sulfide and sulfate % | 0.73 | 0.64 | 0.58 | 0.87 | 0.91 |

It can be seen from the above table that the amount of the sludge and the sintering temperature both have an important influence on the performance and quality of the ceramsite.

(1) The increase or decrease in the amount of the sludge affected the quality of the ceramsite.

When the sludge content is too large by weight, compared to Embodiment 1, the ceramsite of comparative example 1 had a lower cylinder compressive strength, and the ceramsite is more fragile after being sintered, which is mainly due to the fact that when the sludge content is relatively large, there are many surface cracks and relatively big internal voids during the sintering of the ceramsite, that leads to a decrease in the strength of the ceramsite.

When the amount of the sludge is reduced to a certain extent, the bulk density and cylinder compressive strength of the ceramsite are affected. In comparative example 2, the bulk density of the ceramsite is increased and the cylinder compressive strength of the ceramsite is slightly reduced as compared with that in Embodiment 1. The strength and bulk density of the ceramsite are preferable when the amount of the sludge is in the value range defined by the present invention.

(2) The sintering temperature has a significant effect on the quality of the ceramsite.

In comparative example 3, as compared with Embodiment 1, when the temperature is excessively high, more and more raw material components are melted into a liquid phase and became a vitreous substance, which increased the volume shrinkage of the ceramsite, made the densities of the surface and interior of the ceramsite increase, and reduced the water absorption rate of the ceramsite. When the temperature exceeded 1050° C., the gas pressure inside the ceramsite increased due to the subsequent reaction of gas production, resulting in volume expansion and density reduction.

In comparative example 4, as compared with Embodiment 1, when the temperature is too low, some components in the material pellets are not completely melted, its internal structure is loose, and only a small part formed the vitreous substance. The burning expansion of the ceramsite occurs when meeting the following 2 conditions: when heating to a high temperature, the raw materials should be able to form a viscous vitreous phase to seal the gas released from the interior of the raw materials; and after the viscous vitreous phase is formed at the high temperature, gas materials should be released. A too low temperature would cause some of the raw materials to fail to form the vitreous phase, thereby affecting the burning expansion of the ceramsite.

Only when the temperature is maintained within a certain range, the vitreous is formed inside the ceramsite as a main body, a compact structure and a uniformly closed pore structure can be formed. These structures made the ceramsite have a higher strength factor;

In the present invention, a two-stage sintering is used, the raw materials are subjected to the low-temperature sintering for preparing the vitreous phase formed by the burning expansion. The viscosity of the liquid phase in the sintering process is moderate, which had a relatively favorable effect on the expanding property of the ceramsite. Subsequently, the high-temperature sintering is quickly performed, which is conducive to the burning expansion. As the sintering temperature in furnace B increased, more and more components of the raw materials are melted into a liquid phase and became a vitreous substance. Increasing the volume shrinkage of the ceramsite made the densities of the surface and interior of the ceramsite able to reduce the water absorption rate of the ceramsite. When the temperature is too high, it caused the performance of the ceramsite to decrease.

By the technical solution of the present invention, the obtained ceramsite has the following obvious advantages.

(1) The generation of the large chunks of sintered materials is reduced, thereby reducing the subsequent crushing work accordingly.

The municipal sludge, used as a raw material, is used for preparing ceramsite after being added with the auxiliary materials. Less large chunks of sintered materials are produced. It has been found, through the experiment, that the weight of the large chunks of sintered materials accounts for about 8% of the weight of the obtained materials, which greatly reduces the subsequent crushing work and saves energy consumption. The reasons are analyzed as follows.

When the sludge material pellets are self-ignited in the furnace, the heat is not easy to lose, causing its temperature to increase rapidly, and the surrounding pressure and organic matter are reduced, causing its volume to reduce rapidly. At this time, the inorganic matter in the material pellets are in a semi-melted state, and adhesion occurs between each other. However, due to the addition of some auxiliary materials in the present invention, the material pellets generate some gas during the burning process, which causes the semi-melted body coat in the outer layer to expand to form air bubbles. Due to the presence of the large amount of air bubbles and the adhesion between each other, the sludge pellet, after losing a large amount of materials, will not collapse but it is smaller than the original size. Moreover, due to the addition of the auxiliary materials, the degree of adhesion between the material pellets is reduced accordingly, thereby reducing the generation of large chunks of sintered materials. Therefore, the subsequent crushing work is reduced accordingly.

(2) The cylinder compressive strength is relatively high and the bulk density is relatively low.

In the present invention, a multi-stage sintering is performed. When sintered in the first stage, the pore distribution inside the ceramsite is relatively uniform. The pores are small and numerous. The main reasons are as follows: The liquid phase on the surface of the ceramsite increases as the sintering temperature increases; the viscosity of the surface of the ceramsite pellet is moderate; and the internal organic matter is decomposed into a gas at a high temperature continuously escaping from the surface of the ceramsite pellet, thereby forming a hollow porous structure inside the ceramsite. During the heating process in the first stage, the liquid phase on the surface of the ceramsite penetrates into the interior of the pores of the ceramsite, reducing the size of the pores, and the interior of the ceramsite becomes compact, thereby increasing the density of the ceramsite particles. When the sintering temperature of the ceramsite is further increased and maintained for a certain period of time, a compacted small pore structure is formed inside the material pellet. Meanwhile, these small pores are interconnected, or series-connected to each other, thereby forming large pores, which also leads to a decrease in the bulk density of the ceramsite particles.

From the data of the ceramsite properties in Table 1, it can be concluded that the ceramsite of Embodiment 1 has higher strength and lower bulk density, which not only meets the requirements of national standards, but also meets market requirements. The ceramsite, with a relatively low bulk density is obtained, which is favorable for the market promotion of the ceramsite.

Embodiment 2

A method for preparing ceramsite by using a municipal sludge taken from a sewage treatment plant in Qingdao include the following specific steps.

(1) Drying: the municipal sludge is concentrated, digested, mechanically dehydrated and dried to obtain a raw sludge with a water content of about 22%. The step of digesting is the same as that in Embodiment 1.

(2) Preparing ingredients: raw materials are taken according to the following parts by weight: 80 parts of raw sludge, 10 parts of fly ash, 1 part of kaolinite, 5 parts of steelmaking slag, 5 parts of zeolite, 1 part of hematite, 5 parts of calcareous shale, 5 parts of waste incineration fly ash, 0.5 part of $Fe_2O_3$, 1 part of a waste glass, 0.1 part of calcium carbonate, 0.1 part of sodium lauryl sulfate, and 0.1 part of sodium benzoate.

(3) The raw materials in step (2) are taken for mixing and stirring uniformly, and the stirred materials are poured into a granulating machine for granulation, and the particle size is controlled to range from 15 mm to 20 mm.

(4) The material pellets after the granulation are dried at 90° C. for 2 hours, then preheated at 220° C. for 20 minutes, and then quickly transferred to a sintering device for sintering.

The sintering device has two furnaces, a temperature provided in furnace A is 600° C., and a temperature provided in furnace B is 900° C.; the preheated materials are sintered in furnace A for 5 minutes, then quickly transferred to furnace B for sintering for 6 minutes, and then cooled to room temperature.

(5) The cooled materials are discharged, and large chunks of the cooled materials are crushed to obtain crushed materials with a maximum particle size of 20-26 mm.

(6) The crushed materials are separated and screened to obtain a first ceramsite having a particle size of 5-15 mm, a second ceramsite having a particle size of 15-26 mm, a ceramic sand having a particle size of 0.5-5 mm, and a fine powder having a particle size of less than 0.5 mm.

The waste incineration fly ash is from a municipal solid waste treatment plant.

The ceramsite prepared in Embodiment 2 has a relatively high strength, a small bulk density and a good quality, which is favorable for the market promotion of ceramsite.

Embodiment 3

A method for preparing ceramsite by using a municipal sludge taken from a sewage treatment plant in Qingdao include the following specific steps.

(1) Drying: the municipal sludge is concentrated, digested, mechanically dehydrated and dried to obtain a raw sludge with a water content of about 24%. The step of digesting is the same as that in Embodiment 1.

(2) Preparing ingredients: raw materials are taken according to the following parts by weight: 120 parts of raw sludge, 20 parts of fly ash, 5 parts of kaolinite, 20 parts of steelmaking slag, 15 parts of zeolite, 5 parts of hematite, 15 parts of calcareous shale, 20 parts of waste incineration fly ash, 2 parts of $Fe_2O_3$, 4 parts of waste glass, 2 parts of calcium carbonate, 2 parts of sodium lauryl sulfate, and 1.5 parts of sodium benzoate.

(3) The raw materials in step (2) are taken for mixing and stirring uniformly, and the stirred materials are poured into a granulating machine for granulation, and the particle size is controlled to range from 15 mm to 20 mm.

(4) The material pellets after the granulation are dried at 110° C. for 1 hour, then preheated at 280° C. for 10 minutes, and then quickly transferred to a sintering device for sintering.

The sintering device has two furnaces, a temperature provided in furnace A is 800° C., and the temperature provided in furnace B is 1100° C.; the preheated materials are sintered in furnace A for 3 minutes, then quickly transferred to furnace B for sintering for 4 minutes, and then cooled to room temperature.

(5) The cooled materials are discharged, and large chunks of the cooled materials are crushed to obtain crushed materials with a maximum particle size of 20-26 mm.

(6) The crushed materials are separated and screened to obtain a first ceramsite having a particle size of 5-15 mm, a second ceramsite having a particle size of 15-26 mm, a ceramic sand having a particle size of 0.5-5 mm, and a fine powder having a particle size of less than 0.5 mm.

The waste incineration fly ash is from a municipal solid waste treatment plant.

The ceramsite prepared in Embodiment 3 has a relatively high strength, a small bulk density and a good quality, which is favorable for the market promotion of the ceramsite.

Embodiment 4

A method for preparing ceramsite by using a municipal sludge as a raw material included the following specific steps.

(1) Drying: the municipal sludge is concentrated, digested, mechanically dehydrated, and dried to obtain a raw sludge.

The step of the digesting included: removing a readily biodegradable organic matter in the municipal sludge by a common anaerobic process.

(2) Preparing ingredients: raw materials are taken according to the following parts by weight: 100 parts of raw sludge, 15 parts of fly ash, 3 parts of kaolinite, 15 parts of steelmaking slag, 10 parts of zeolite, 3 parts of hematite, 10 parts of calcareous shale, 12 parts of waste incineration fly ash, 1.5 parts of $Fe_2O_3$, 2.5 parts of waste glass, 1.2 parts of calcium carbonate, 1.2 parts of sodium lauryl sulfate, 0.8 parts of sodium benzoate, 0.3 part of nano zirconia, 3 parts of kaolinite porcelain clay; 3 parts of silicon nitride; and 2 parts of calcium oxide.

(3) The raw materials in step (2) are taken for mixing and stirring uniformly, the stirred materials are poured into a granulating machine for granulation, and the particle size is controlled to be 18 mm.

(4) The material pellets after the granulation are dried at 100° C. for 1.5 hours, then preheated at 250° C. for 15 minutes, and then quickly transferred to a sintering device for sintering.

(5) The cooled materials are discharged, and large chunks of the cooled materials are crushed to obtain crushed materials with a maximum particle size of about 24 mm.

(6) The crushed materials are separated and screened to obtain a first ceramsite having a particle size of 10 mm, a second ceramsite having a particle size of 20 mm, a ceramic sand having a particle size of 2.5 mm, and a fine powder having a particle size of less than 0.5 mm.

Embodiment 5

A method for preparing ceramsite by using a municipal sludge as a raw material included the following specific steps.

(1) Drying: the municipal sludge is concentrated, digested, mechanically dehydrated and dried to obtain a raw sludge.

The step of the digesting included: removing a readily biodegradable organic matter in the municipal sludge by a common anaerobic process.

(2) Preparing ingredients: raw materials are taken according to the following parts by weight: 80 parts of raw sludge, 10 parts of fly ash, 1 part of kaolinite, 10 parts of steelmaking slag, 5 parts of zeolite, 1 part of hematite, 5 parts of calcareous shale, 5 parts of waste incineration fly ash, 0.5 part of $Fe_2O_3$, 1 part of waste glass, 0.1 part of calcium carbonate, 0.1 part of sodium lauryl sulfate, 0.1 part of sodium benzoate, 0.1 part of nano zirconia, 1 part of kaolinite porcelain clay; 2 parts of silicon nitride; and 1 part of calcium oxide.

(3) The raw materials in step (2) are taken for mixing and stirring uniformly, the stirred materials are poured into a granulating machine for granulation, and the particle size is controlled to be 15 mm.

(4) The material pellets after the granulation are dried at 90° C. for 1 hour, then preheated at 220° C. for 10 minutes, and then quickly transferred to a sintering device for sintering.

(5) The cooled materials are discharged, and large chunks of the cooled materials are crushed to obtain crushed materials with a maximum particle size of about 20 mm.

(6) The crushed materials are separated and screened to obtain a first ceramsite having a particle size of 5 mm, a second ceramsite having a particle size of 15 mm, a ceramic sand having a particle size of 0.5 mm, and a fine powder having a particle size of less than 0.5 mm.

TABLE 1

Properties of ceramsite prepared in embodiments 2-5

|  | Embodiment 2 | Embodiment 3 | Embodiment 4 | Embodiment 5 |
|---|---|---|---|---|
| Particle grading | 2.8 | 2.8 | 2.9 | 2.9 |
| Bulk density (kg/m$^3$) | 185 | 185 | 189 | 188 |
| Apparent density (kg/m$^3$) | 846 | 845 | 845 | 845 |
| Cylinder compressive strength (MPa) | 2.5 | 2.6 | 2.8 | 2.7 |
| Water absorption rate % | 17.5 | 17.7 | 17.6 | 17.4 |
| Softening coefficient | 0.94 | 0.96 | 0.98 | 0.96 |
| Grain shape factor | 1.37 | 1.35 | 1.36 | 1.37 |
| Sludge content % | 1.8 | 1.9 | 1.8 | 1.8 |
| Sludge lump content % | 0.56 | 0.57 | 0.58 | 0.57 |
| Boiling mass loss % | 4.21 | 4.23 | 4.24 | 4.25 |
| Ignition loss % | 3.7 | 3.8 | 3.7 | 3.8 |
| Content of sulfide and sulfate % | 0.74 | 0.72 | 0.73 | 0.72 |

As can be seen from the data in the above table, in embodiments 2-5 of the present invention, the obtained ceramsite had a relatively good performance, a relatively small bulk density, and a relatively small apparent density. In particular, the ceramsite in embodiments 4-5 have better performance in all aspects.

The specific implementing methods of the present invention has been described above in combination with the embodiments, but it is not intended to limit the scope of the present invention. It should be understood by those skilled in the art that various modifications or variations can be made based on the technical solution of the present invention by those skilled in the art without departing from the scope of the present invention.

What is claimed is:

1. A method for preparing ceramsite by using municipal sludge as a raw material, comprising:
   (1) drying: concentrating, digesting, mechanically dehydrating and drying the municipal sludge to obtain a raw sludge;
   wherein the step of the digesting comprises: removing a biodegradable organic matter in the municipal sludge by a common anaerobic process;
   (2) preparing ingredients: taking the ingredients according to the following parts by weight: 80-120 parts of the raw sludge, 10-20 parts of fly ash, 1-5 parts of kaolinite, 10-20 parts of steelmaking slag, 5-15 parts of zeolite, 1-5 parts of hematite, 5-15 parts of calcareous shale, 5-20 parts of waste incineration fly ash, 0.5-2 parts of $Fe_2O_3$, 1-4 parts of waste glass, 0.1-2 parts of calcium carbonate, 0.1-2 parts of sodium lauryl sulfate, and 0.1-1.5 parts of sodium benzoate;
   (3) mixing and stirring the ingredients uniformly to obtain stirred materials, pouring the stirred materials into a granulating machine for a granulation to obtain material pellets, and controlling a particle size of the material pellets to range from 15 mm to 20 mm;
   (4) drying the material pellets after the granulation at 90-110° C. for 1-2 hours to obtain dried material pellets, then preheating the dried material pellets at 220-280° C. for 10-20 minutes to obtain preheated material pellets, then transferring the preheated material pellets to a sintering device for a sintering to obtain sintered material pellets, and then cooling the sintered material pellets to obtain cooled materials;
   (5) discharging the cooled materials, and crushing large chunks of the cooled materials into crushed materials with a maximum particle size of 20-26 mm; and
   (6) separating and screening the crushed materials to obtain a first ceramsite having a particle size of 5-15 mm, a second ceramsite having a particle size of 15-26 mm, a ceramic sand having a particle size of 0.5-5 mm, and a fine powder having a particle size of less than 0.5 mm.

2. The method for preparing the ceramsite by using the municipal sludge as the raw material of claim 1, wherein, the raw sludge in step (1) has a water content of 22-24%.

3. The method for preparing the ceramsite by using the municipal sludge as the raw material of claim 1, wherein, a two-stage sintering is performed in the sintering device in step (4) comprises: first, sintering the preheated material pellets at a low temperature, and then sintering the preheated material pellets at a high temperature.

4. The method for preparing the ceramsite by using the municipal sludge as the raw material of claim 1, wherein, the sintering device in step (4) comprises two furnaces including a first furnace and a second furnace, a temperature provided in the first furnace is 600-800° C., and a temperature provided in the second furnace is 900-1100° C.; the preheated material pellets are sintered in the first furnace for 3-5 minutes, then transferred to the second furnace for sintering for 4-6 minutes, and then cooled to room temperature.

5. The method for preparing the ceramsite by using the municipal sludge as the raw material of claim 1, wherein, the waste incineration fly ash in step (2) is from a municipal solid waste treatment plant.

6. The method for preparing the ceramsite by using the municipal sludge as the raw material of claim 1, wherein, the step of the digesting in step (1) comprises: pouring the municipal sludge into a digesting tank, and adding facultative bacteria and anaerobic bacteria to decompose the biodegradable organic matter in the municipal sludge into carbon dioxide, methane, and water.

7. A method for preparing ceramsite by using municipal sludge as a raw material, comprising:
   (1) drying: concentrating, digesting, mechanically dehydrating and drying the municipal sludge to obtain a raw sludge;
   wherein the step of the digesting comprises: removing a biodegradable organic matter in the municipal sludge by a common anaerobic process;
   (2) preparing ingredients: taking the ingredients according to the following parts by weight: 80-120 parts of the raw sludge, 10-20 parts of fly ash, 1-5 parts of kaolinite, 10-20 parts of steelmaking slag, 5-15 parts of zeolite, 1-5 parts of hematite, 5-15 parts of calcareous shale, 5-20 parts of waste incineration fly ash, 0.5-2 parts of $Fe_2O_3$, 1-4 parts of waste glass, 0.1-2 parts of calcium carbonate, 0.1-2 parts of sodium lauryl sulfate, 0.1-1.5 parts of sodium benzoate, 0.1-0.5 part of nano zirconia, 1-5 parts of kaolinite porcelain clay; 2-4 parts of silicon nitride; and 1-4 parts of calcium oxide;

(3) mixing and stirring the ingredients uniformly to obtain stirred materials, putting the stirred materials into a granulating machine for a granulation to obtain material pellets, and controlling a particle size of the material pellets to range from 15 mm to 20 mm;

(4) drying the material pellets after the granulation at 90-110° C. for 1-2 hours to obtain dried material pellets, then preheating the dried material pellets at 220-280° C. for 10-20 minutes to obtain preheated material pellets, then transferring the preheated material pellets to a sintering device for a sintering to obtain sintered material pellets, and then cooling the sintered material pellets to obtain cooled materials;

(5) discharging the cooled materials, and crushing large chunks of the cooled materials into crushed materials with a maximum particle size of 20-26 mm; and (6) separating and screening the crushed materials to obtain a first ceramsite having a particle size of 5-15 mm, a second ceramsite having a particle size of 15-26 mm, a ceramic sand having a particle size of 0.5-5 mm, and a fine powder having a particle size of less than 0.5 mm.

8. The method for preparing the ceramsite by using the municipal sludge as the raw material of claim 3, wherein, the sintering device in step (4) comprises two furnaces including a first furnace and a second furnace, a temperature provided in the first furnace is 600-800° C., and a temperature provided in the second furnace is 900-1100° C.; the preheated material pellets are sintered in the first furnace for 3-5 minutes, then transferred to the second furnace for sintering for 4-6 minutes, and then cooled to room temperature.

\* \* \* \* \*